Jan. 5, 1932.  E. C. GLEDHILL  1,839,755
LEANING WHEEL
Filed June 3, 1931  2 Sheets-Sheet 1
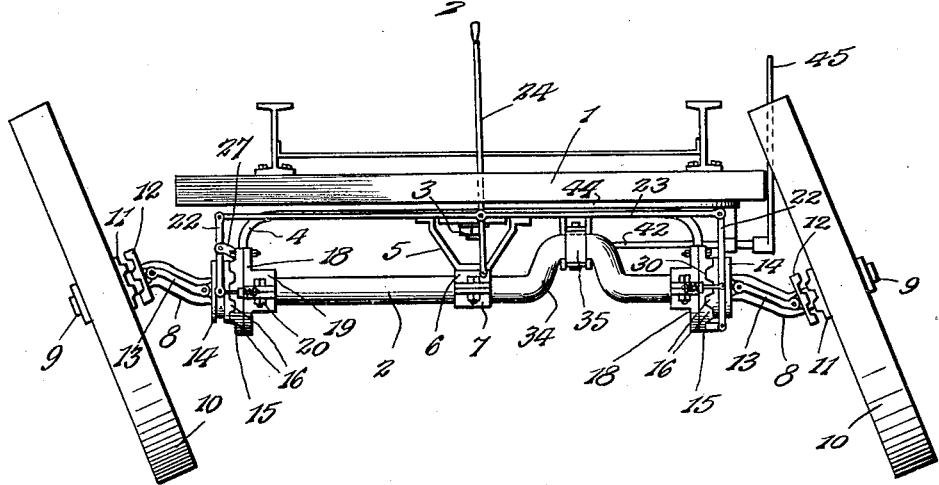
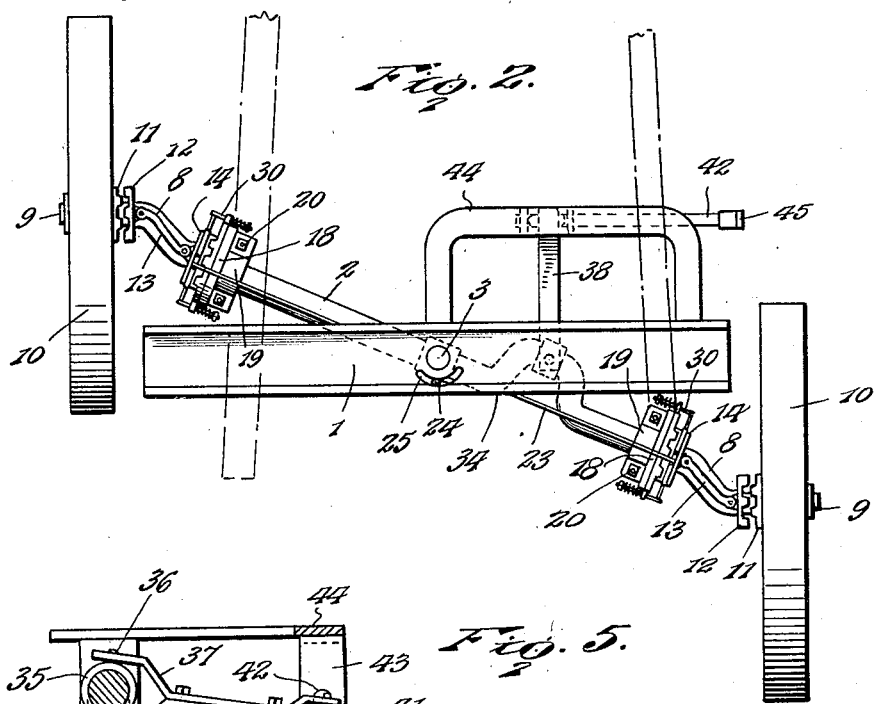
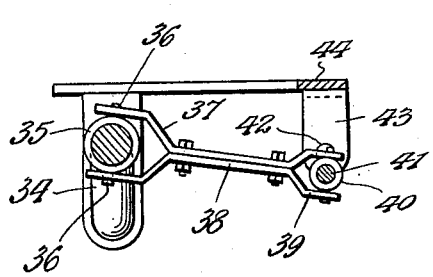
Inventor
E. C. Gledhill.
By Lacey & Lacey,
Attorneys Jan. 5, 1932.  E. C. GLEDHILL  1,839,755
LEANING WHEEL
Filed June 3, 1931    2 Sheets-Sheet 2
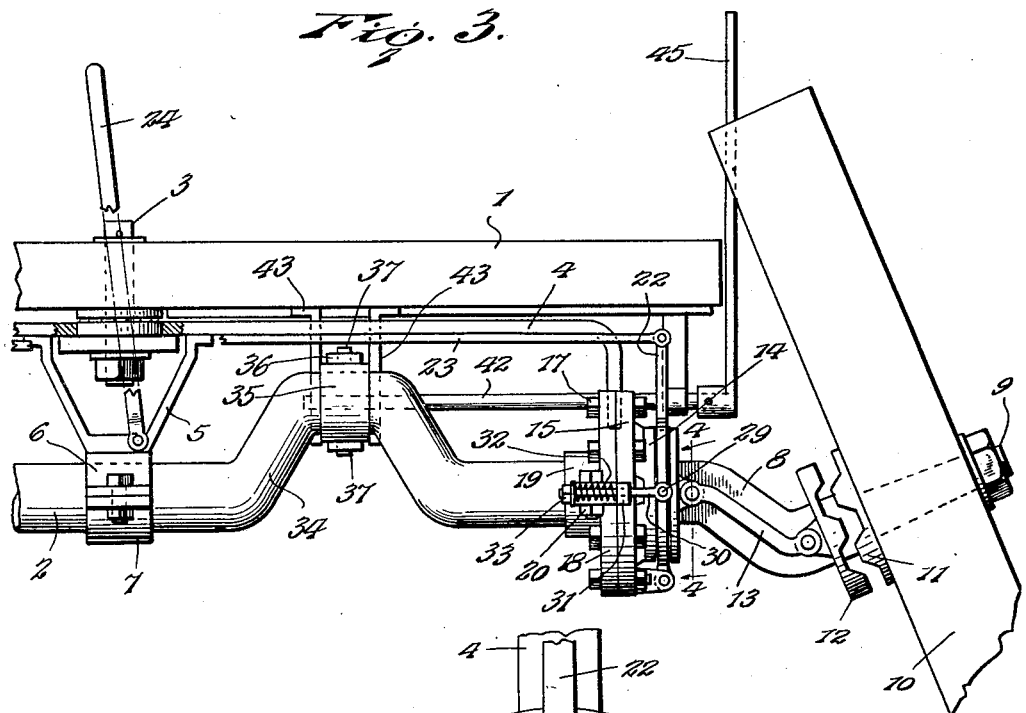
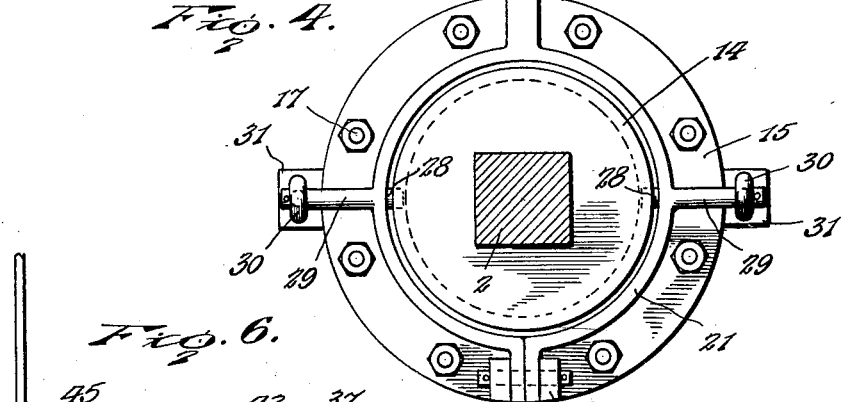
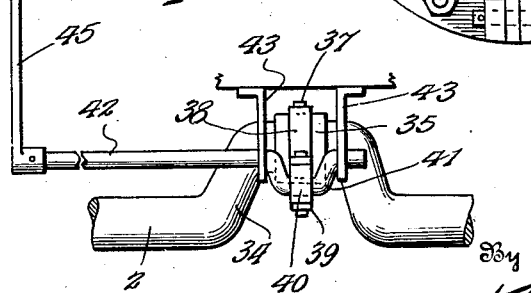
Inventor
E. C. Gledhill.
By Lacey & Lacey,
Attorneys Patented Jan. 5, 1932

1,839,755

UNITED STATES PATENT OFFICE

EDWARD C. GLEDHILL, OF GALION, OHIO

LEANING WHEEL

Application filed June 3, 1931. Serial No. 541,926.

Experience with road grading machinery has demonstrated the desirability of having the wheels tilted when the machine is at work, so that they will aid in resisting the side thrust imposed on the machine, while, when the machine is not in operation but is being moved along the road, the wheels should be set vertically and parallel with the longitudinal plane of the machine. The present invention has for its object the provision of simple and efficient means whereby the wheels may be brought to the desired position during travel of the machine, and the invention resides in certain novel features which are illustrated in the accompanying drawings and will be hereinafter first fully described and then more particularly defined in the appended claims.

In the drawings,

Figure 1 is a rear elevation of a portion of a road grader having the invention applied thereto, and showing the wheels tilted to the left, Fig. 2 is a top plan view showing the wheels disposed in vertical planes and parallel with the grader, Fig. 3 is an enlarged rear elevation, Fig. 4 is an enlarged section on the line 4—4 of Fig. 3, Fig. 5 is a detail view of a connection between the crank axle and the frame of the grader, and Fig. 6 is a front elevation, on a larger scale, of the parts shown in Fig. 5.

The road grader may be of any well-known or approved type, and illustration of the same is unnecessary herein, a portion of a transverse frame bar being indicated at 1 in order that the application of the invention may be fully comprehended. The beam 1, which is indicated in the drawings, is a part of the rear end portion of the grader frame, and the rear axle 2 is carried thereby. Rotatably mounted within the beam 1 is a king bolt or pivot 3, and carried by the lower end of said king bolt is a supplemental frame 4 in the form of an arched bar having an open bracket 5 secured thereto and depending therefrom at its center, said bracket spanning the king bolt, as shown in Figs. 1 and 3, and at the lower end of said bracket is a half bearing 6 mating with a similar half bearing 7 which encircles the axle and forms a support therefor. It will thus be seen that the axle may rotate in its bearing 6, 7 and may also turn about the king bolt with the frame 4, the ends of said frame being connected with the axle, as will presently appear. Each end of the axle is bent, as indicated at 8, and terminates in a spindle 9 which is disposed at an angle to the bent portion 8, although the center point of each spindle is on a line with the axis of the axle. By reason of the bending of the ends of the axle and the angular disposition of the spindles, the ground wheels 10 mounted on the spindles will always be disposed at an angle to the axle and, if the axle be disposed at a right angle to the longitudinal plane of the grader, the wheels will be tilted to the right or the left, as the case may be, but if the axle be disposed obliquely at an angle of about 45° to the longitudinal medial line of the grader, the wheels will be disposed in parallel vertical planes, as will be understood upon reference to Fig. 2. The wheels are mounted rotatably upon the spindles 9 and held thereon in the usual manner, and will preferably be provided with anti-friction bearings. On its inner side, each wheel is provided with a clutch face 11 to cooperate with a mating clutch ring 12 slidably fitted upon the axle and normally free of the wheel, so that the wheel may rotate freely about the spindle. The clutch ring 12 is disposed upon the spindle immediately adjacent the bend of the axle, and it is connected through a link 13 with a second clutch ring 14 which is slidably mounted upon the axle at the inner side of the inner end of the bend 8, as clearly shown in the drawings. The ends of the frame 4 are turned downwardly and each rigidly secured to a clutch ring 15 which is adapted to mate with the ring 14, said rings 14 and 15 having interengaging lugs 16 upon their opposed faces, as will be understood. The clutch ring 15 is a continuous ring fitted about the axle, and it is secured by bolts 17 to a support 18 which is constructed in two similar, semi-circular members adapted to be brought together about the axle and formed with hub sections 19 secured together by bolts 20 fitted through mating lugs thereon. The down-turned ends of the frame 4 are disposed between the opposed faces of the members 15 and 18 and are rigidly secured therein, as will be understood, so that said members 15 and 18 will be held against turning at all times. The clutch ring 14 is constructed with an external annular groove receiving the shifting ring or yoke 21 whereby the clutch member may be moved to or from the clutch ring 15 so as to be engaged therewith or disengaged therefrom, and, of course, the clutch ring 12 will follow the movements of the clutch ring 14 so that the clutch members 11 and 12 will be disengaged when the members 14 and 15 are engaged and vice versa. The shifting ring or yoke 21 forms a part of a lever 22 which is pivoted at its upper end to a connecting rod 23 disposed transversely of the grader and extending across the same. The hand lever 24 is pivoted at its lower end upon the bracket 5 and, at an intermediate point, is pivoted to the connecting rod 23, so that if the hand lever be rocked the connecting rod will be shifted endwise and the levers 22 pivoted to the ends of the connecting rod will be likewise rocked. The lever 24 will, of course, follow the pivotal movements of the axle, and, to accommodate the same, it is carried upwardly through an arcuate slot 25 in the beam 1, as shown in Fig. 2. The two levers 22 must, of course, move the respective clutch rings 14 in opposite directions, and, for this reason, I have shown the lever 22 at the right-hand side of the machine as fulcrumed at its lower end upon lugs 26 on the adjacent clutch ring 15, while the left 22 at the left-hand side of the machine is fulcrumed upon similar lugs 27 at the top of the adjacent clutch ring 15. The yoke or shifting ring 21 may be fitted directly within the annular groove of the clutch ring 14 but, in Fig. 4, I have shown the shifting ring or yoke as provided with inwardly extending radial lugs 28 engaging the groove. Alined with said lugs 28 are external radial pins 29 which are engaged in the eyes of eye-bolts 30 extending rearwardly from the pins and slidably fitted in ears 31 on the periphery of the clutch ring 15, expansion springs 32 being disposed about the eye-bolts between said guiding ears and nuts 33 on the inner ends of the bolts, whereby the yoke is normally held in such position that the clutch rings 14 and 15 will be engaged.

Adjacent its pivotal support, the axle 2 is formed with a crank 34, and a ring or collar 35 is mounted upon said crank, said collar having diametrically opposite studs 36 upon its outer circumference, which are pivotally engaged by a yoke 37 formed at the rear end of a connecting bar 38 which projects forwardly and is provided at its front end with a smaller yoke 39. Said yoke 39 is pivotally mounted upon a collar 40 which is carried by the crank 41 formed at the inner end of a rock shaft 42 mounted in bearings 43 on a bracket 44 which is secured upon the main frame. The rock shaft 42 is disposed transversely of the grader and extends to the side of the same, its outer end being equipped with a hand lever 45 whereby it may be set in a desired position.

It will be noted that while the axle is capable of rotation in its bearing 6, 7, the extent of such rotation is limited inasmuch as the connecting bar 38 is held against movement at its front end and, consequently, will permit the crank 34 of the axle to move only through a semi-circle, which will be disposed vertically at the front of the axis of the axle. When the axle is in the position shown in Fig. 2, with the crank horizontal, the wheels 10 will be vertical and parallel with the grader, so that the machine may be transported over a road. If it be desired to tilt the wheels, as when the machine is to perform work, the lever 24 is rocked so that the levers 22 will move the clutch rings 14 outwardly from the clutch rings 15, and this movement will simultaneously, of course, engage the clutch rings 12 with the clutch rings 11. The rotation of the wheels will then be transmitted to the axle so that the axle will be rotated in its bearing 6, 7, and this rotation will cause the spindles 9 to tilt upwardly or downwardly, as shown in Fig. 1, and the crank 34 of the axle will move either upwardly or downwardly. When the wheels have been brought to the desired inclination, the hand lever 24 is shifted so that the clutches 11, 12 will be opened and the clutches 14, 15 will hold the axle against further rotation, while the wheels will be free to rotate about their respective spindles. It may be noted at this point that the axle is flat-sided through its bent portions but is of circular cross section at the spindles and between the bent portions. The crank 34 is always vertical when the wheels are tilted, and if the clutches 11, 12 be maintained closed, the forward travel of the machine, assuming the wheels to be in the position shown in Figs. 1 and 3, will cause the wheels to rotate and, at the end of one-quarter of a revolution, they will be brought into the position indicated in Fig. 2. At the end of a half revolution, the wheels will again be tilted but will lean to the right instead of to the left, as shown in the drawings, and, at the end of a third quarter of a revolution, they will be again in the position shown in Fig. 2, while, at the end of a complete revolution, they will be returned to the position shown in Figs. 1 and 3. Inasmuch as the crank will be held at a fixed radial distance from the rock shaft 42, some pivotal movement will be imparted to the axle 2 as it is rotated, the result being that whenever the wheels are vertical the axle will be disposed obliquely, as shown in Fig. 2. Ordinarily, when the wheels are tilted, the axle will be at a right angle to the line of travel, but it is sometimes desirable to dispose the axle in a slightly oblique position while maintaining the wheels in a tilted position and to this end, I provide the rock shaft 42 with its crank 41. By rocking said shaft 42, the connecting bar 38 will be shifted forwardly or backwardly, and this movement will cause the axle 2 to turn about the pivotal center provided by the king bolt 3.

Having thus described the invention, I claim:

1. The combination of an axle having spindles at its ends disposed at an angle to the axis of the axle, means for permitting rotation of the axle, means for limiting the rotation, a pivotal mounting for the axle, wheels rotatably mounted upon the spindles, and means for locking the wheels to the axle whereby to impart rotation thereto.

2. The combination of an axle mounted for pivotal movement and limited rotation, spindles fixed to the ends of the axle and disposed at an angle thereto, wheels mounted upon the spindles for free rotation, and means whereby the wheels may be locked to the axle to impart rotation to the same and rock the spindles whereby to set the wheels in vertical or tilted positions.

3. The combination of a support, a frame mounted on the support between its ends for pivotal turning movement, a bearing carried by said frame, an axle fitted in said bearing whereby it may have pivotal and rotating movement, bearings for the axle at the ends of the frame, spindles at the ends of the axle disposed at an angle thereto, wheels mounted upon the spindles for free rotation, clutch members cooperating with the wheels, other clutch members cooperating with said frame and connected with the first-mentioned clutch members, and means for shifting said clutch members whereby the wheels may be caused to impart rotation to the axle or the axle will be held against rotation.

4. The combination of a support, a frame mounted upon the support for pivotal movement, bearings carried by said frame at the ends and at the center thereof, and axle mounted in said bearings and having a crank portion, spindles at the ends of the axle disposed at an angle thereto, wheels mounted on the spindles for free rotation, means whereby the wheels may be locked to the axle or held free thereof, a link mounted at its rear end upon the crank portion of the axle, and means for holding the front end of said link stationary.

5. The combination of a support, a frame pivoted between its ends on the support, bearings carried by said frame at its ends and at its center, an axle mounted in said bearings and having a crank portion, spindles at the ends of the axle disposed at an angle thereto, wheels mounted on the spindles for free rotation, means for locking the wheels to the axle whereby the axle may be caused to rotate, a link pivotally mounted upon and extending forward from the crank portion of the axle, and a rock shaft having a crank engaged with the front end of said link.

6. The combination of an axle mounted for pivotal movement and for limited rotation, spindles at the ends of the axle in fixed angular relation thereto, wheels rotatable on the spindles, means whereby rotation of the wheels will shift the axle and spindles to set the wheels in vertical or in tilted position, and means for imparting a limited pivotal movement to the axle when the wheels are vertical.

In testimony whereof I affix my signature.

EDWARD C. GLEDHILL. [L. S.]